(12) United States Patent
Xiong

(10) Patent No.: US 10,096,299 B2
(45) Date of Patent: Oct. 9, 2018

(54) ADAPTIVE BRIGHTNESS CONTROL FOR DARK DISPLAY CONTENT

(71) Applicant: Dell Products L.P., Round Rock, TX (US)

(72) Inventor: Dengzhai Xiong, Singapore (SG)

(73) Assignee: Dell Products L.P., Round Rock, TX (US)

( * ) Notice: Subject to any disclaimer, the term of this patent is extended or adjusted under 35 U.S.C. 154(b) by 178 days.

(21) Appl. No.: 15/289,475

(22) Filed: Oct. 10, 2016

(65) Prior Publication Data

US 2018/0102107 A1    Apr. 12, 2018

(51) Int. Cl.
*G09G 5/10* (2006.01)
*G06T 3/40* (2006.01)
*G06T 5/00* (2006.01)

(52) U.S. Cl.
CPC ............. *G09G 5/10* (2013.01); *G06T 3/4023* (2013.01); *G06T 5/009* (2013.01); *G06T 2207/20208* (2013.01); *G09G 2320/0646* (2013.01); *G09G 2354/00* (2013.01); *G09G 2360/12* (2013.01); *G09G 2360/144* (2013.01)

(58) Field of Classification Search
CPC ............. G09G 5/10; G09G 2320/0646; G09G 2354/00; G09G 2360/12; G09G 2360/144; G06T 3/4023; G06T 5/009; G06T 2207/20208
See application file for complete search history.

(56) References Cited

U.S. PATENT DOCUMENTS

| | | | | |
|---|---|---|---|---|
| 2008/0291139 A1* | 11/2008 | Hsieh | ........................ | G09G 3/20 345/77 |
| 2010/0176752 A1* | 7/2010 | Xiong | .................... | H05B 37/02 315/363 |
| 2014/0333656 A1* | 11/2014 | Wang | ........................ | G09G 5/02 345/591 |
| 2015/0116344 A1* | 4/2015 | Won | ........................ | G09G 3/32 345/589 |
| 2017/0358275 A1* | 12/2017 | Klement | .................. | G09G 5/10 |

* cited by examiner

*Primary Examiner* — Ke Xiao
*Assistant Examiner* — Jed-Justin Imperial
(74) *Attorney, Agent, or Firm* — Baker Botts L.L.P.

(57) ABSTRACT

An adaptive learning algorithm uses a light sensor and a content analyzer to generate boost curves of low-end pixel values to boost the brightness of display content. The adaptive learning algorithm considers the user's manual input to learn the user's preferred boost curves for given conditions. The boost curves are used to digitally boost the gain of the low-end pixels to have higher brightness to improve the visibility of dark display content.

20 Claims, 4 Drawing Sheets

ADAPTIVE BRIGHTNESS CONTROL FOR DARK DISPLAY CONTENT

BACKGROUND

Field of the Disclosure

This disclosure relates generally to information handling system displays and, more particularly, to adaptive brightness control for dark display content.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Display devices, such as liquid crystal displays (LCDs) are commonly used to display graphics content to users. In certain types of applications, the graphics contents may often be created and rendered with high dynamic contrast range. For example, the graphics content in video games may include high dynamic contrast in order to provide a more immersive viewing and gaming experience to viewers and players. However, as a result of the high dynamic contrast range, some scenes in games and other types of content may be rendered so dark that certain objects become difficult to observe, which is undesirable.

SUMMARY

In one aspect, a disclosed method is for adaptive brightness control for dark display content. The method may include receiving a first indication of ambient light conditions at an information handling system outputting display content via a display device to a user, receiving a second indication of brightness characteristics of the display content, and receiving a third indication of user boost input to increment or decrement brightness of the display content. Based on the first indication, the second indication and the third indication, the method may further include determining a preferred boost curve for the user. In the method, the boost curve may specify a boost range comprising a number of boost bands and a boost gain for each of the boost bands in the boost range. In the method, a boost band may specify a range of input pixel values. After a predetermined boost time has elapsed without change to the preferred boost curve, the method may also include storing the boost curve for the user. Based on the first indication and the second indication, the method may further include retrieving a current boost curve for the user, the current boost curve selected from previously stored preferred boost curves for the user, and applying the current boost curve to boost the gain of selected pixels specified by the current boost curve, including rescaling the selected pixels at a graphics frame buffer associated with a graphics processing unit.

In any of the disclosed embodiments of the method, the graphics processing unit may be included in a display adapter driving the display device.

In any of the disclosed embodiments of the method, the graphics processing unit may be included in the display device.

In any of the disclosed embodiments of the method, determining the preferred boost curve for the user may further include applying a range function to determine the boost range, and applying a gain function to determine the boost gain for each boost band. The range function may depend on a boost time, a pixel level, and user control. The gain function may depend on a pixel level, an ambient light level, a number of boost bands, and user control.

In any of the disclosed embodiments of the method, determining the preferred boost curve for the user may further include using a first look-up table to determine the range function, and using a second look-up table to determine the gain function.

In any of the disclosed embodiments of the method, receiving the second indication may further include querying a histogram analysis block of the graphics processing unit to retrieve the brightness characteristics, including a plurality of boost bands and associated pixel levels for the boost bands corresponding to the display content.

In any of the disclosed embodiments of the method, the third indication may be used at least in part to determine the boost range.

Other disclosed aspects include a non-transitory computer-readable medium storing instructions executable by a graphics processing unit, a display adapter including a graphics processing unit, and a display device including a graphics processing unit.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
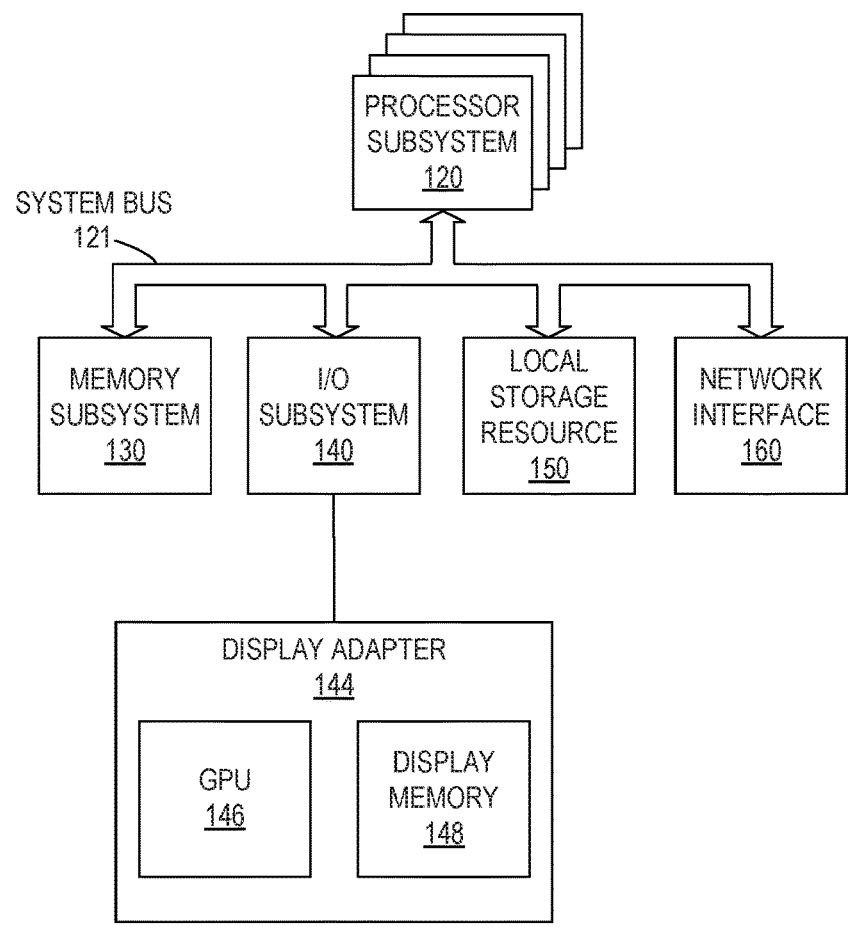
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), or flash memory (SSD), as well as communications media such wires, optical fibers, microwaves, radio waves, and other electromagnetic or optical carriers, or any combination of the foregoing.

As noted, certain content created and rendered for display may include dark display content that is difficult to perceive by a viewer. For example, certain motion pictures as well as graphics content in video games may be generated for rendering with a high dynamic contrast range that results in very dark display content. Depending on the type of display and the ambient lighting conditions, the dark display content may be difficult to observe by viewers, such as the players of a video game, which is undesirable. Although certain specific types of monitors have been developed with limited capability for boosting the output of the dark content based on direct user input, the variability of various factors, including ambient lighting conditions as well as the actual display content generated for the display, may make such static and manual input-based solutions difficult to use and unsatisfactory for many users.

As disclosed herein, adaptive brightness control for dark display content may be implemented to boost the brightness of certain individual pixels using a graphics processing unit, such as in a display adapter or in a display controller of a display device. The adaptive brightness control for dark display disclosed herein may continuously analyze certain individual pixel values of display content, as well as ambient lighting conditions that are monitored using a light sensor. The adaptive brightness control for dark display disclosed herein may be enabled to learn a user's preferences over time to automatically increase or decrease the boosting of brightness of pixel values. As a result, the adaptive brightness control for dark display disclosed herein may reduce an amount of manual input provided by the user to attain a desired brightness boosting for different kinds of display content and under different ambient lighting conditions.

Particular embodiments are best understood by reference to FIGS. 1, 2, 3, 4, and 5 wherein like numbers are used to indicate like and corresponding parts.

Turning now to the drawings, FIG. 1 illustrates a block diagram depicting selected elements of an embodiment of information handling system 100. As described herein, information handling system 100 may represent a personal computing device, such as a personal computer system, a desktop computer, a laptop computer, a notebook computer, etc., operated by a user. In various embodiments, information handling system 100 may be operated by the user using a keyboard and a mouse (not shown).

As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 and various components associated therewith may be implemented using hardware, software, or any combination thereof.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory subsystem 130). In the same or alternative embodiments, processor subsystem 120 may interpret and execute program instructions and process data stored remotely (e.g., in a network storage resource, not shown).

Also in FIG. 1, memory subsystem 130 may comprise a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCM-CIA card, flash memory, magnetic storage, opto-magnetic storage, or a suitable selection or array of volatile or non-volatile memory that retains data after power to its associated information handling system, such as system 100, is powered down. Local storage resource 150 may comprise computer-readable media (e.g., hard disk drive, floppy disk drive, CD-ROM, or other type of rotating storage media, flash memory, EEPROM, or another type of solid state storage media) and may be generally operable to store instructions and data.

In system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces, which are not shown for descriptive clarity. As shown, I/O subsystem 140 provides an interface for a display adapter 144, which may provide connectivity for an external display, such as display device 200 (see FIG. 2). As shown, display adapter 144 includes a graphics processing unit (GPU) 146 as well as display memory 144 to which GPU 146 has access. Display adapter 144, and in particular GPU 146 and display memory 148, may be enabled to implement the adaptive brightness control for dark display disclosed herein.

Figure 2:
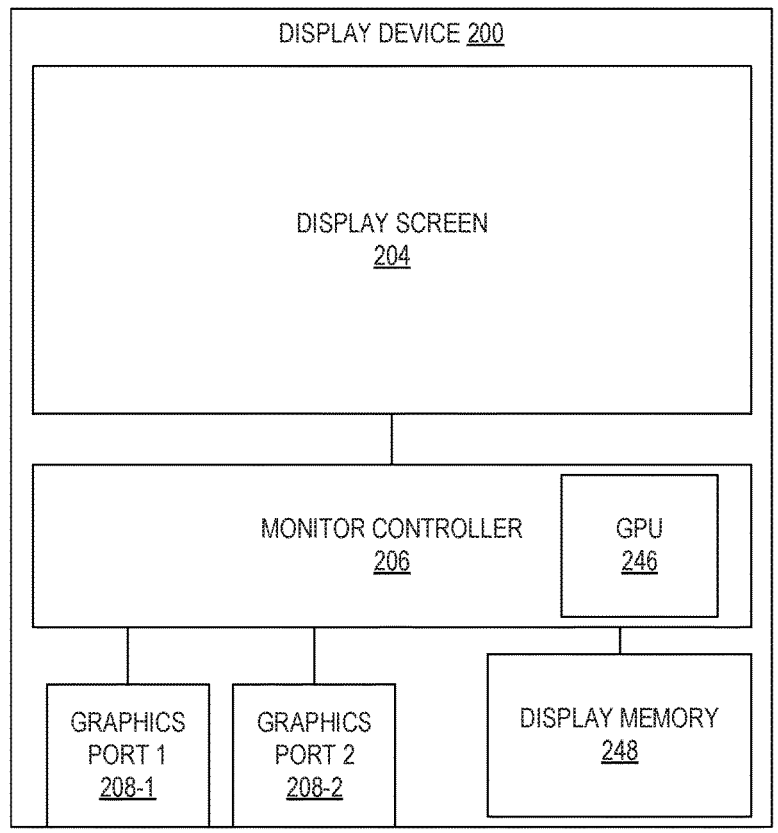
FIG. 2 is a block diagram of selected elements of an embodiment of a display device.

Turning now to FIG. 2, a block diagram of selected elements of an embodiment of a display device 200 is illustrated. In some embodiments, display device 200 may represent a stand-alone device that may be coupled to one or more information handling systems to output display data. It is noted that certain elements of display device 200 are illustrated in FIG. 2 for descriptive clarity and it will be understood that display device 200 may include additional components, in different embodiments. As used herein, the term "output" with regard to display data shall refer to display of optical elements (i.e., pixels) representing the display data on a display screen 204 and may represent a continuing process where the display data is constantly updated at a given refresh rate.

As shown in FIG. 2, display device 200 accordingly includes display screen 204 and monitor controller 206. Display screen 204 may represent any of a variety of display screens and may be implemented in a fixed resolution corresponding to a number of pixels included within display screen 204. In some embodiments, display screen may be enabled for a resolution of 3840×2160 pixels (referred to as '4K resolution'). In some embodiments, display screen 204 may include an actively illuminated element, such as a backlight (not shown). Display screen 204 may be implemented using various types of display technology, including, but not limited to, light-emitting diodes (LED), liquid crystal displays (LCD), plasma displays, organic LED displays, among others.

In FIG. 2, monitor controller 206 may include processing capability to receive display data and generate corresponding control signals to drive display screen 204. Monitor controller 206 may further include internal processing capability, such as for rescaling display data to different display regions and aspect ratios. As shown, monitor controller 206 includes a GPU 246 having access to display memory 248, thereby enabling display device 200 to include similar capability as display adapter 144, described above. In some embodiments, when display adapter 144 is used to render content for output to display device 200, GPU 246 may be omitted from monitor controller 206 and GPU 146 may implement the adaptive brightness control for dark display disclosed herein. In various embodiments, even when display adapter 144 is used, GPU 246 may implement the adaptive brightness control for dark display disclosed herein. In operation with a respective GPU 146 or GPU 246, display memory 148 or display memory 248 may store a frame buffer for outputting video frame data. The frame buffer may include pixel values for each individual pixel in display screen 204.

In FIG. 2, display device 200 is shown including two graphics ports 208, namely graphics port 1 208-1 and graphics port 2 208-2. Each graphics port 208 may represent a wired interface for receiving display data from an external source, such as an information handling system (see FIG. 1) and may be different types of ports or a different instance of the same type of port. Graphics ports 208 may be analog ports (e.g., video graphics adapters (VGA), among others) or digital ports (e.g., digital video interface (DVI), high-definition multimedia interface (HDMI), display port (DP), among others). Particularly when graphics ports 208 are digital ports, graphics ports 208 may support bidirectional communication with an information handling system to both receive display data and to send/receive other information, such as display control information. In some embodiments, graphics port 208 may support a wireless interface that operates similarly to the wired interfaces described above. Furthermore, it is noted that when compression technology is used with the display data, the display data may be decompressed by monitor controller 206 or GPU 246 before being written to the frame buffer in display memory 248.

Figure 3:
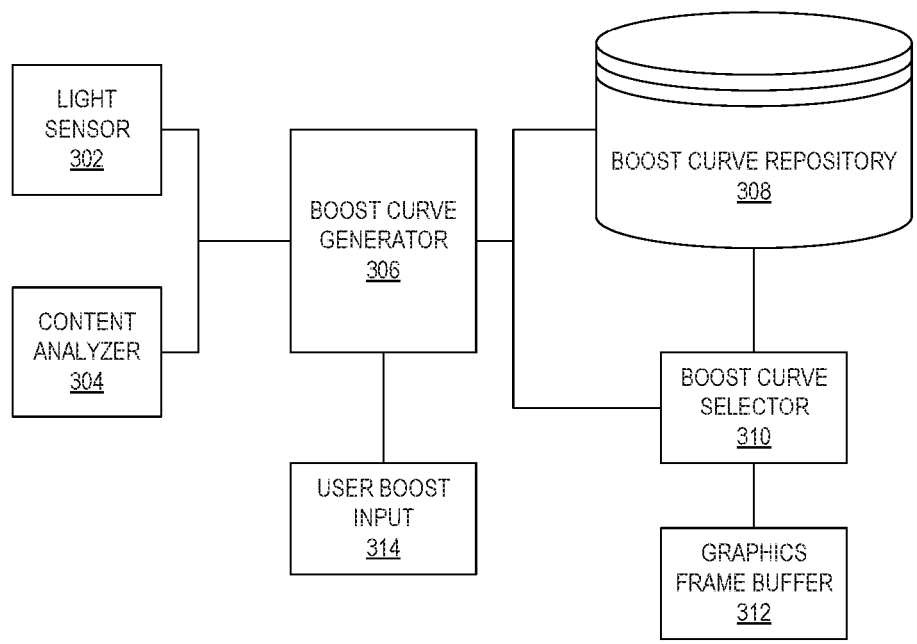
FIG. 3 is a block diagram of selected elements of an embodiment of a system for adaptive brightness control for dark display content.

Referring now to FIG. 3, a block diagram of selected elements of an embodiment of a system 300 for adaptive brightness control for dark display content is shown. System 300 is shown including various elements and functionality, as will be explained in further detail. It is noted that in various embodiments, fewer or more elements may be included in system 300. As shown system 300 includes a light sensor 302, a content analyzer 304, a boost curve generator 306, a boost curve repository 308, a boost curve selector 310, a graphics frame buffer 312 (implemented using display memory 148 or 248), and user boost input 314.

As noted, system 300 may be used to boost the brightness of certain pixel values associated with dark display content. The brightness of a given display content may be analyzed based on a distribution of pixel values for certain sets or collections pixels, which is referred to as a "histogram band". Specifically, for each histogram band covering a range of pixels, a "pixel value" Y is used to refer to the average luminance of the pixels included in the histogram band, which indicates brightness. In some color spaces, luminance is defined as one of the components representing the pixel and the luminance value may be directly used. In other color spaces, luminance may be calculated from the pixel components. For example, using a standard red-green-blue (sRGB) color space, the luminance Y may be calculated from the linear RGB pixel components using Equation 1.

$$Y=(0.2126)*R+(0.7152)*G+(0.0722)*B \quad \text{Equation (1)}$$

In Equation 1, R, G, and B refer to the sRGB values for a given pixel. When Equation 1 is used for a collection of pixels, such as the histogram band described above, R, G, and B may refer to average values for the collection of pixels, such that Y is the luminance for the collection of pixels. In GPU 146 or GPU 246, a histogram analysis block may be included as a functional block that is accessible and may be used to calculate the histogram bands as well as R, G, B and Y for the histogram band.

In the description of the adaptive brightness control for dark display disclosed herein, certain terms shall be defined as follows:

Boosting Band (BB)—a histogram band representing a range of pixels in a brightness histogram;

Boosting Range (BR)—a range of BBs subject to boosting of pixel luminance. The BR is assumed to begin at the lowest histogram band (darkest histogram band) and extends for a number of BBs (#BB) to a cut-off point (brightest histogram band being boosted);

Boost Gain (BG)—is the actual gain applied to each band in the BR;

Boost Time (BT)—is a duration of time that a user remains at a given boost level and ambient lighting conditions without providing user boost input 314 to adjust boosting levels;

Pixel Level (PL)—refers to the pixel level for display content, such as luminance Y;

Ambient Lighting (AL)—refers to the output of light sensor 302; and

User Control (UC)—refers to user boost input 314 to adjust boosting levels, may be step up (increment) or step down (decrement). The UC may be in the form of keyboard input.

For the purposes of adaptive brightness control for dark display content, as described herein, two main input factors affecting the visibility of display content may be assumed. A first input factor is the brightness of the display content on the display device. In some cases, the brightness of the display content may be characterized by the average pixel value of luminance Y for all displayed pixels, as given by Equation 1, for example. The brightness of the display content may also be characterized for individual histogram bands, by applying Equation 1 to determine the luminance Y as a pixel value for each histogram band. The number of pixels that fall into each histogram band may indicate an overall brightness for the display content. For example, when a larger fraction of pixels fall into histogram bands having a low pixel value Y, the display content will appear relatively darker. By boosting the pixel values of the pixels falling into such low pixel value bands, the pixels distribution may be shifted towards more brightness and the overall brightness of the image may be improved. A second input factor is the ambient lighting condition. Generally, as the ambient light reaching the display device becomes brighter, the less visible the dark display content will appear. For this reason, for example, cinemas are shown in low levels of ambient light in order to improve the perceived display contrast.

To implement the adaptive brightness control for dark display content disclosed herein, picture processing blocks in a GPU can be manipulated to alter pixel values in graphics frame buffer 312 to achieve a desired level of brightness, which is referred to herein as "boosting" the pixel values. For example, to increase the visibility of dark display content, the pixel values of the lower histogram bands of the display content may be boosted, while pixel values of higher histogram bands beyond the cut-off point are not altered, which maintains the brightness of the display content at higher histogram bands and serves to preserve the overall intended perception of the display content.

As shown in FIG. 3, boost curve generator 306, which may be a software routine, may receive an indication of the ambient light conditions from light sensor 302. Light sensor 302 may be integrated with information handling system 100, or may be an external device. Furthermore, boost curve generator 306 may receive an indication of the brightness of the display content on the display device from content analyzer 304. Content analyzer 304 may be a software routine that utilizes the histogram analysis block included in a GPU to analyze the display content in real time.

As shown, boost curve generator 306 may include an adaptive learning algorithm that uses the input parameters AL, PL, BT, and UC to determine a value for BR (#BB) and the BG for each histogram band based on #BB. The implementation of the adaptive learning algorithm may be based on two functions: a range function and a gain function. The range function determines BR (#BB) up to the cut-off point and is a function of (BT, PL, UC). The gain function determines BG for each #BB and is a function of (PL, AL, #BB, UC).

For the range function, under a given ambient light condition and a given display content having defined histogram bands with given pixel values, the number of histogram bands to be boosted BR is a function of the boost time BT a user has spent after cumulative UC adjustment. For example, when a user begins to display content (such as by starting a movie, or beginning gameplay of a video game), an initial boosting range BR_init may be applied. BR_init may represent a previously learned value of BR for the user (such as from a previous session by the user) or may represent a default value. Then, boost curve generator 306 may calculate an integral effect of boosting requests over an elapsed period of time T, such as given by Equation 2.

$$BR(t)=BR\_\text{init}+\int_0^T k*UC(t)dt \quad \text{Equation (2)}$$

In Equation 2, t is a current time and k is a scaling factor. For example, when the user steps up (increments) the boost gain while the average pixel level does not decrease, such UC may indicate that a wider boosting range is desired by the user; when the user decreases the boost gain while the average pixel level does not increase, such UC may indicate that a narrower boosting range is desired by the user.

For the gain function, the boosting gain BG of each histogram band in the boosting range BR is a function of current pixel level PL, current ambient lighting level AL, user's control UC, and the total number of bands #BB in the boosting range. The gain function may be implemented under consideration of various aspects. For example, a current value of PL may inversely determine a weighting of how much a UC will contribute to BG. The lower the current PL, the more weighting may be given for an additional UC. The current AL may have a direct effect on the weighting. In other words, the higher the AL, the more weighting may be given for an additional UC. A shaping function may be used for the bands (#BB) in the boosting range BR to determine BG. The shaping function may maintain BG values at the lower histogram bands and may dampen BG values to zero when approaching the cut-off point. An example implementation of the results of the range function and the gain function are described below with respect to FIG. 4, which shows different boost curves in one particular implementation. It is noted that the mathematical operations described above may be implemented using discrete or continuous functional algorithms to determine BR and calculate BG for each #BB. In some embodiments, a first look-up table may be used for the range function to determine BR (#BB) and a second look-up table may be used for the gain function to calculate BG for each #BB for a given set of input conditions of AL and PL.

Over time, as boost curve generator 306 generates various boost curves, as described above, certain preferred boost curves for a user may be ascertained and recorded in boost curve repository 308. Boost curve repository 308 may be a local or remote database storing boost curve data that are indexed to particular users. For example, when the user maintains a given boost curve for BT or at least a minimum period of active usage time, a preference for the given boost curve for the user may be indicated, and the given boost curve may be recorded.

In real time operation of system 300, boost curve generator 306 may send current values for PL and AL to boost curve selector 310, which may also be a software routine. Boost curve selector 310 may access boost curve repository 308 and may select and retrieve a corresponding boost curve (not shown in FIG. 3). Then, boost curve selector 310 may apply the selected boost curve at graphics frame buffer 312, by causing the selected boost curve to be applied to the pixels corresponding to the BR for each frame of display content that is rendered and output at display screen 204.

Figure 4:
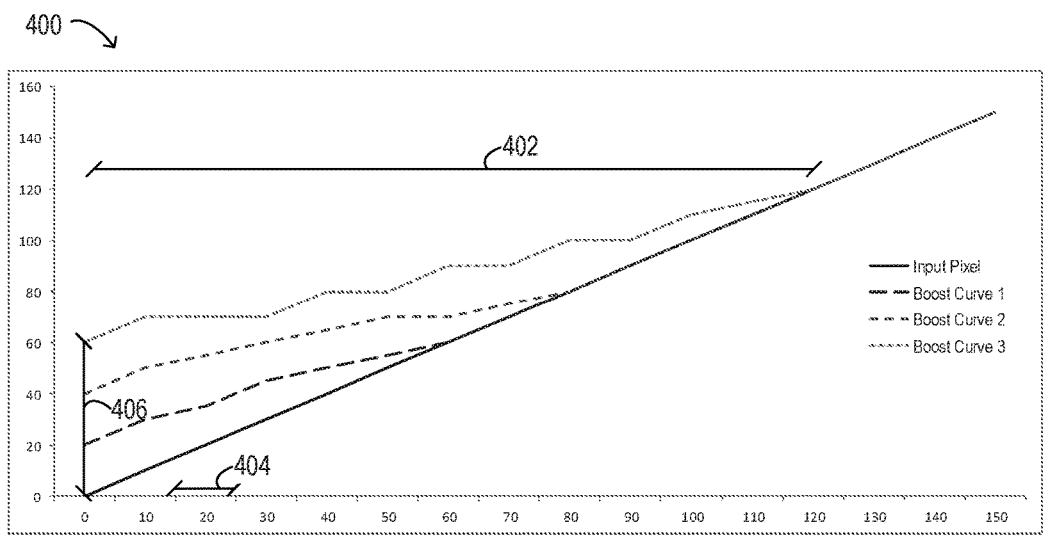
FIG. 4 is a data plot of selected boost curve data for a display device.

Referring now to FIG. 4, a data plot 400 of selected boost curve data for a display device is shown. It is noted that data plot 400 is an exemplary embodiment of one particular implementation of the output of system 300 for adaptive brightness control for dark display content. The data in data plot 400 are shown in Table 1 below and show values for a pixel luminance range that is coded from 0 to 255 (8 bit). It is noted that other ranges for the pixel luminance may be used in other embodiments. It will be assumed that the boost curves in Table 1 are for a given user. Boost curve 1 may represent a low boost level, boost curve 2 may represent a medium boost level, while boost curve 3 may represent a high boost level.

TABLE 1

Data for data plot 400 in FIG. 4.

| Input Pixel | Boost Curve 1 | Boost Curve 2 | Boost Curve 3 |
|---|---|---|---|
| 0 | 20 | 40 | 60 |
| 10 | 30 | 50 | 70 |
| 20 | 35 | 55 | 70 |
| 30 | 45 | 60 | 70 |
| 40 | 50 | 65 | 80 |
| 50 | 55 | 70 | 80 |
| 60 | 60 | 70 | 90 |
| 70 | 70 | 75 | 90 |
| 80 | 80 | 80 | 100 |
| 90 | 90 | 90 | 100 |
| 100 | 100 | 100 | 110 |
| 110 | 110 | 110 | 115 |

TABLE 1-continued

Data for data plot 400 in FIG. 4.

| Input Pixel | Boost Curve 1 | Boost Curve 2 | Boost Curve 3 |
|---|---|---|---|
| 120 | 120 | 120 | 120 |
| 130 | 130 | 130 | 130 |
| 140 | 140 | 140 | 140 |
| 150 | 150 | 150 | 150 |

In FIG. 4, the boosting range BR 402 extends from pixels having 0 pixel level to pixels having 120 pixel level, in one example. The individual histogram bands are shown as boost band BB 404, have a width of 10 in data plot 400. A boost gain BG 406 is shown for boost curve 3. It is noted that the boost curves in data plot 400 are pixel scaling curves and do not show the actual histogram bands from the display content.

Figure 5:
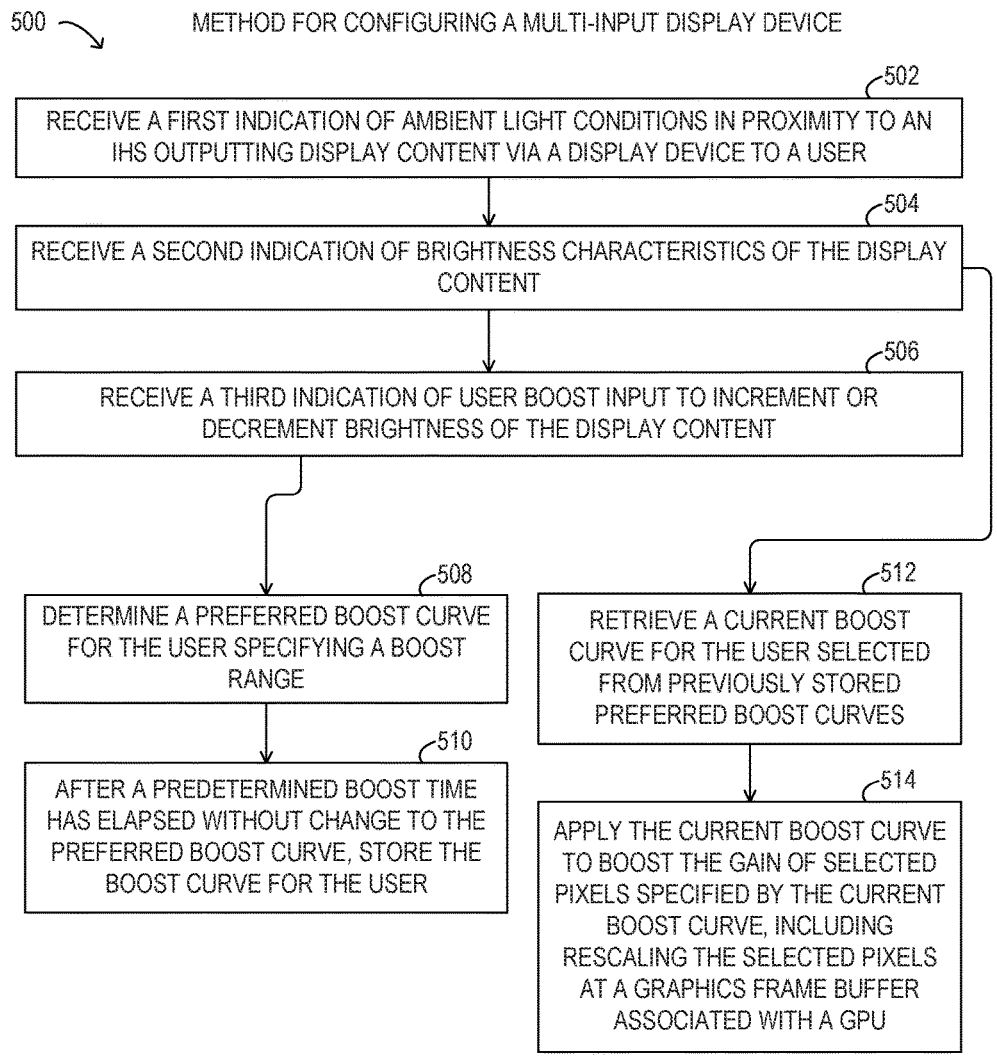
FIG. 5 is flowchart depicting selected elements of an embodiment of a method for adaptive brightness control for dark display content.

Referring now to FIG. 5, a block diagram of selected elements of an embodiment of method 500 for adaptive brightness control for dark display content, as described herein, is depicted in flowchart form. In various embodiments, method 500 is performed by GPU 146 (see FIG. 1) or GPU 246 (see FIG. 2), for example using instructions executable by the GPU. It is noted that certain operations described in method 400 may be optional or may be rearranged in different embodiments.

In FIG. 5, method 500 begins at step 502 by receiving a first indication of ambient light conditions in proximity to an information handling system outputting display content via a display device to a user. The ambient light conditions may be provided using an ambient light sensor that is included with the information handling system, the display device, or is a separate device. At step 504, a second indication is received of brightness characteristics of the display content. After step 504, a learning algorithm may be implemented in steps 506, 508, 510 to populate boost curve repository 308 with preferred boost curves for the user. Also after step 504, a real-time execution of automatic boost functionality to select a current boost curve based on the populated boost curve repository 308 may be implemented in steps 512, 514. At step 506, a third indication of user boost input to increment or decrement brightness of the display content is received. At step 508, a preferred boost curve for the user is determined that specifies a boost range. The boost range may include a number of boost bands and a boost gain for each of the boost bands in the boost range. After a predetermined boost time has elapsed without change to the preferred boost curve, at step 510, the boost curve for the user is stored. At step 512, a current boost curve for the user is retrieved, the current boost curve selected from previously stored preferred boost curves for the user. At step 514, the current boost curve is applied to boost the gain of selected pixels specified by the current boost curve, including rescaling the selected pixels at a graphics frame buffer associated with a GPU.

As described herein, An adaptive learning algorithm uses a light sensor and a content analyzer to generate boost curves of low-end pixel values to boost the brightness of display content. The adaptive learning algorithm considers the user's manual input to learn the user's preferred boost curves for given conditions. The boost curves are used to digitally boost the gain of the low-end pixels to have higher brightness to improve the visibility of dark display content.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for adaptive brightness control for dark display content, the method comprising:
   receiving a first indication of ambient light conditions in proximity to an information handling system outputting display content via a display device to a user;
   receiving a second indication of brightness characteristics of the display content;
   receiving a third indication of user boost input to increment or decrement brightness of the display content;
   based on the first indication, the second indication and the third indication, determining a preferred boost curve for the user, wherein the boost curve specifies a boost range comprising a number of boost bands and a boost gain for each of the boost bands in the boost range, wherein a boost band specifies a range of input pixel values;
   after a predetermined boost time has elapsed without change to the preferred boost curve, storing the boost curve for the user;
   based on the first indication and the second indication, retrieving a current boost curve for the user, the current boost curve selected from previously stored preferred boost curves for the user; and
   applying the current boost curve to boost the gain of selected pixels specified by the current boost curve, including rescaling the selected pixels at a graphics frame buffer associated with a graphics processing unit.

2. The method of claim 1, wherein the graphics processing unit is included in a display adapter driving the display device.

3. The method of claim 1, wherein the graphics processing unit is included in the display device.

4. The method of claim 1, wherein determining the preferred boost curve for the user further comprises:
   applying a range function to determine the boost range, wherein the range function depends on a boost time, a pixel level, and user control;
   applying a gain function to determine the boost gain for each boost band, wherein the gain function depends on a pixel level, an ambient light level, a number of boost bands, and user control.

5. The method of claim 4, wherein determining the preferred boost curve for the user further comprises:
   using a first look-up table to determine the range function; and
   using a second look-up table to determine the gain function.

6. The method of claim 1, wherein receiving the second indication further comprises:
   querying a histogram analysis block of the graphics processing unit to retrieve the brightness characteristics, including a plurality of boost bands and associated pixel levels for the boost bands corresponding to the display content.

7. The method of claim 1, wherein the third indication is used at least in part to determine the boost range.

8. A non-transitory computer-readable medium storing instructions, that, when executed by a graphics processing unit, configure the graphics processing unit for:
   receiving a first indication of ambient light conditions in proximity to an information handling system outputting display content via a display device to a user;
   receiving a second indication of brightness characteristics of the display content;
   receiving a third indication of user boost input to increment or decrement brightness of the display content;
   based on the first indication, the second indication and the third indication, determining a preferred boost curve for the user, wherein the boost curve specifies a boost range comprising a number of boost bands and a boost gain for each of the boost bands in the boost range, wherein a boost band specifies a range of input pixel values;
   after a predetermined boost time has elapsed without change to the preferred boost curve, storing the boost curve for the user;
   based on the first indication and the second indication, retrieving a current boost curve for the user, the current boost curve selected from previously stored preferred boost curves for the user; and
   applying the current boost curve to boost the gain of selected pixels specified by the current boost curve, including rescaling the selected pixels at a graphics frame buffer associated with the graphics processing unit.

9. The computer-readable medium of claim 8, wherein the graphics processing unit is included in a display adapter driving the display device.

10. The computer-readable medium of claim 8, wherein the graphics processing unit is included in the display device.

11. The computer-readable medium of claim 8, wherein determining the preferred boost curve for the user further comprises:
   applying a range function to determine the boost range, wherein the range function depends on a boost time, a pixel level, and user control;
   applying a gain function to determine the boost gain for each boost band, wherein the gain function depends on a pixel level, an ambient light level, a number of boost bands, and user control.

12. The computer-readable medium of claim 11, wherein determining the preferred boost curve for the user further comprises:
   using a first look-up table to determine the range function; and
   using a second look-up table to determine the gain function.

13. The computer-readable medium of claim 8, wherein receiving the second indication further comprises:
   querying a histogram analysis block of the graphics processing unit to retrieve the brightness characteristics, including a plurality of boost bands and associated pixel levels for the boost bands corresponding to the display content, and wherein the third indication is used at least in part to determine the boost range.

14. A display device, comprising:
   a graphics processing unit having access to a memory, wherein the memory stores instructions that, when executed by the graphics processing unit, configure the graphics processing unit for:
   receiving a first indication of ambient light conditions in proximity to an information handling system outputting display content via a display device to a user;

receiving a second indication of brightness characteristics of the display content;

receiving a third indication of user boost input to increment or decrement brightness of the display content;

based on the first indication, the second indication and the third indication, determining a preferred boost curve for the user, wherein the boost curve specifies a boost range comprising a number of boost bands and a boost gain for each of the boost bands in the boost range, wherein a boost band specifies a range of input pixel values;

after a predetermined boost time has elapsed without change to the preferred boost curve, storing the boost curve for the user;

based on the first indication and the second indication, retrieving a current boost curve for the user, the current boost curve selected from previously stored preferred boost curves for the user; and applying the current boost curve to boost the gain of selected pixels specified by the current boost curve, including rescaling the selected pixels at a graphics frame buffer associated with the graphics processing unit.

15. The display device of claim 14, wherein the graphics processing unit is included in a display adapter driving the display device.

16. The display device of claim 14, wherein the graphics processing unit is included in the display device.

17. The display device of claim 14, wherein determining the preferred boost curve for the user further comprises:

applying a range function to determine the boost range, wherein the range function depends on a boost time, a pixel level, and user control;

applying a gain function to determine the boost gain for each boost band, wherein the gain function depends on a pixel level, an ambient light level, a number of boost bands, and user control.

18. The display device of claim 17, wherein determining the preferred boost curve for the user further comprises:

using a first look-up table to determine the range function; and using a second look-up table to determine the gain function.

19. The display device of claim 14, wherein receiving the second indication further comprises:

querying a histogram analysis block of the graphics processing unit to retrieve the brightness characteristics, including a plurality of boost bands and associated pixel levels for the boost bands corresponding to the display content.

20. The display device of claim 14, wherein the third indication is used at least in part to determine the boost range.

* * * * *